United States Patent Office 2,905,732
Patented Sept. 22, 1959

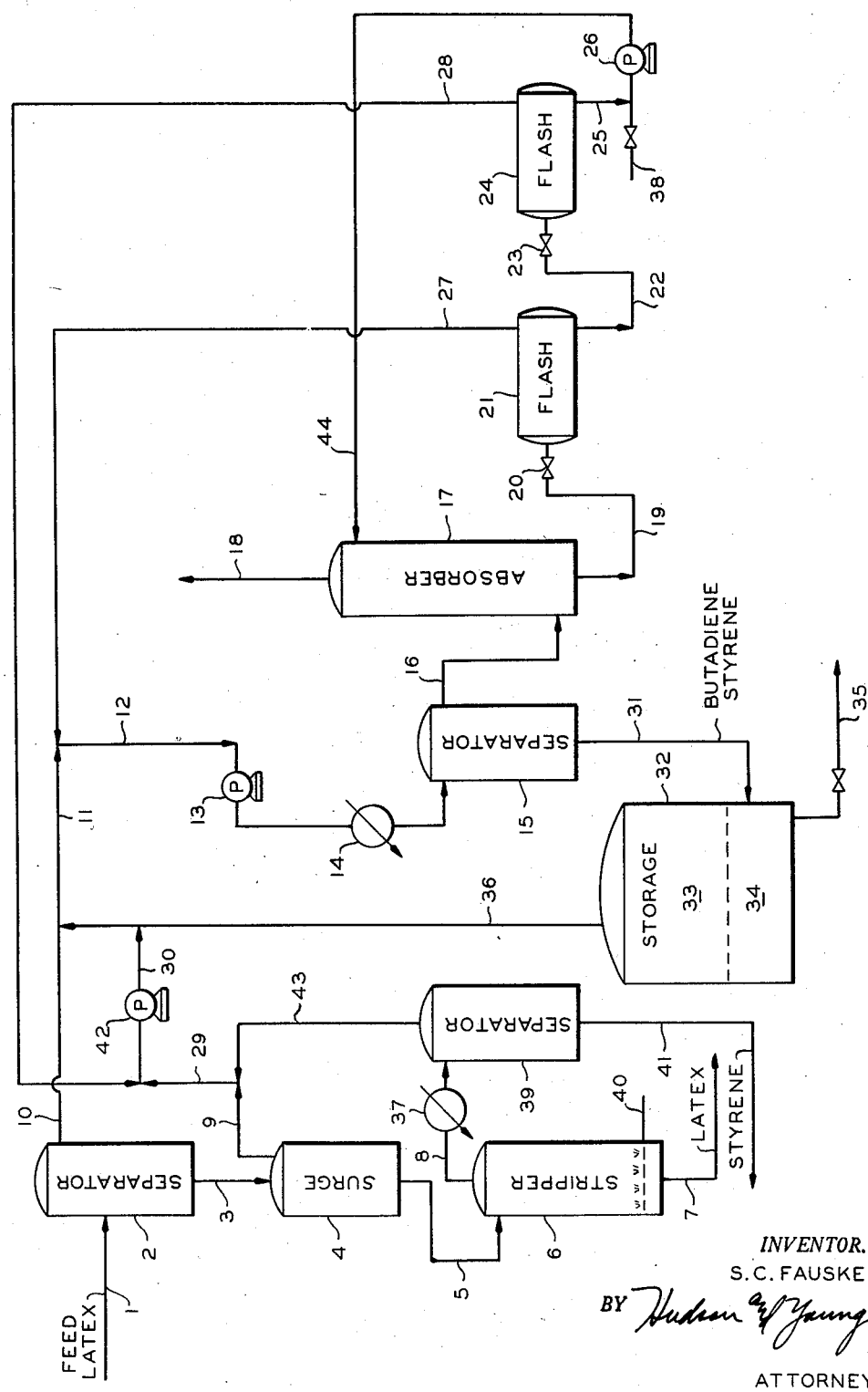

2,905,732

PURIFICATION OF BUTADIENE BY REMOVING IT FROM OXYGEN WITH AN ABSORBENT OIL

Sig C. Fauske, Borger, Tex., assignor to Phillips Petroleum Company, a corporation of Delaware Application April 4, 1955, Serial No. 498,950

10 Claims. (Cl. 260—681.5)

This invention relates to the purification of butadiene. In one aspect it relates to the purification of free oxygen contaminated butadiene by removal of the dissolved free oxygen. In another aspect, it relates to the purification of butadiene containing a minor proportion of styrene by removing contaminating atmospheric oxygen.

In the copolymerization of butadiene and styrene to produce a synthetic elastomer, commonly called GR–S synthetic rubber, unreacted butadiene and styrene are usually present in the latex. This condition exists whether employing the cold rubber polymerization process or an older higher temperature copolymerization process. When utilizing either of these processes for the production of this GR–S rubber the portions of the butadiene and styrene not converted in the polymerization reaction are recovered from the reaction mixture usually by vacuum recovery. As is well known in vacuum processes it is very difficult to exclude all traces of atmospheric oxygen and this butadiene and styrene recovery operation is no exception. Because the contaminating oxygen originates from the atmosphere, the oxygen contaminated materials usually also contains free nitrogen.

It has been found that oxygen dissolved in butadiene and/or styrene markedly affects the rate of copolymerization of these materials. It has also been found that varying concentrations of dissolved oxygen in butadiene and/or styrene cause the rates of copolymerization to vary. Thus, it is difficult to determine whether a batch of butadiene and styrene will copolymerize at the normally expected rate or will copolymerize more rapidly or more slowly than the desired rate. When rates of reaction vary it is difficult to control the temperature of the reaction. The copolymerization reaction is exothermic and too rapid a rate of reaction tends to increase the temperature of the reactants. In the production of cold rubber it is very important to maintain the temperature of the copolymerization reaction within relatively narrow limits.

In vacuum recovered unreacted butadiene and styrene concentrations of oxygen as great as 100 or more parts per mililion have been found. When these reactants as recovered containing such a high concentration of dissolved oxygen are blended with newly produced butadiene containing substantially no dissolved oxygen the mixture usually contains too great a concentration of oxygen for proper plant control of the copolymerization reaction. Thus, it is highly advantageous to maintain the recovered butadiene containing a minor amount of styrene with as low an oxygen content as possible.

In this specification and claims I use the term butadiene to include butadiene containing a minor proportion of styrene. In the above mentioned operation for production of GR–S rubber the vaporous butadiene which contains the contaminating oxygen usually contains about 1 to 1½% styrene. Thus, I use the term butadiene in this specification and claims to mean substantially butadiene that is, butadiene containing about 1 to 1½% styrene.

One method of maintaining a low concentration of dissolved oxygen in recovered butadiene involves treatment of the recovered liquid butadiene with tertiarybutyl catechol, known as TBC. This method, however, is quite expensive. It is preferable to provide a process for preventing oxygen from being present in the liquid butadiene rather than allowing the oxygen to dissolve therein and then treating the liquid for its removal.

One method heretofore employed involves passage of vacuum recovered butadiene into a receiving tank. Upon continued passage of the butadiene into this tank the liquid increases in oxygen content to such an extent that the entire recovered liquid has to be treated for oxygen removal by such a method as that mentioned above.

I have found that by continuously removing vaporous butadiene from the butadiene recovery storage tank, and from the latex purification step and treating these vapors for removal of oxygen that the concentration of dissolved oxygen in the liquid contents or the tank remains relatively small. In fact, the concentration of oxygen in the liquid is sufficiently low that this recovered liquid can be easily blended off with newly produced butadiene for use in the copolymerization reaction. The dissolved oxygen content in the blend has been found to be sufficiently low that it does not adversely affect the rate of the copolymerization reaction.

An object of my invention is to provide a method for recovering unreacted butadiene with a low oxygen content.

Another object of my invention is to provide a method for removing contaminating oxygen from recycle butadiene so that the finally recovered butadiene can be blended with current butadiene production so that the blend will contain such a small proportion of oxygen as not to adversely affect the subsequent copolymerization of butadiene and styrene.

Still another object of my invention is to provide such a purification process which can be continuously operated without the consumption of chemicals.

Still another object of my invention is to provide such a process which is relatively inexpensive to operate and the equipment for which is relatively inexpensive to construct and to maintain.

Still other objects and advantages of my invention will be realized upon reading the following description, which taken with the attached drawing, respectively describes and illustrates a preferred embodiment of my invention.

In the drawing, the figure illustrates in diagrammatic form an arrangement of apparatus parts for carrying out the process of my invention.

I accomplish these and related objects by contacting vaporous butadiene containing said impurity, that is dissolved free oxygen, with an absorbent liquid in an absorption zone, withdrawing absorbent liquid containing dissolved butadiene from said zone, flashing the dissolved butadiene from said absorbent, recovering the butadiene from the flashing operation and removing fixed gas impurity from the absorption zone.

I further accomplished these and related objects by providing a method for purifying a diolefinic hydrocarbon containing free oxygen gas as an impurity comprising contacting vaporous diolefinic hydrocarbon containing said impurity with an absorbent liquid whereby the hydrocarbon is absorbed, removing unabsorbed gas impurity from the operation, flashing the absorbed hydrocarbon from the rich absorbent liquid and recovering the flashed hydrocarbon as the main product of the process.

I still further accomplished these and related objects by providing a method for purifying an easily vaporizable hydrocarbon containing free oxygen gas as an impurity comprising contacting vapors of said hydrocarbon containing said oxygen gas with an absorbent liquid whereby the hydrocarbon is absorbed, removing unabsorbed gas impurity from the absorbing operation, flashing the absorbed hydrocarbon from the absorbent liquid and recovering the flashed hydrocarbon as the main product of the process.

Referring now to the drawing reference numeral 1 identifies a pipe through which latex passes from a butadiene-styrene copolymer plant into a separator 2. From this separator vapors are withdrawn through lines 10, 11 and 12 under influence of a vacuum pump 13. The pumped material is at least partially condensed in a condenser 14 and the condensed and uncondensed materials are passed into a separator 15. From this separator vaporous material is withdrawn through a pipe 16 and is passed into an absorber 17 in which it is contacted with a mineral seal absorption oil. Enriched absorption oil is removed from the absorber and is passed through a line 19 and through a pressure reduction valve 20 into a flash tank 21. From this tank partially depleted absorption oil is withdrawn and passed by way of a pipe 22 and a pressure reduction valve 23 into a second flash tank 24. Fully flashed absorption oil is withdrawn from this latter tank through a pipe 25 and is transferred by means of pump 26 through a pipe 44 into the upper portion of the absorption vessel 17 to complete the mineral seal oil cycle.

The liquid separated from vapor in the separator tank 2 is passed therefrom by way of a pipe 3 into a surge tank 4. From this tank separated liquid is withdrawn through a pipe 5 and is passed into a stripper 6. In this stripper a small amount of steam is introduced by way of a pipe 40 for removing final traces of unreacted styrene and any butadiene not separated in separator 2. Latex free from unreacted hydrocarbon is removed from stripper 6 through a pipe 7 for such disposal or subsequent use as desired. Overhead vaporous material from stripper 6 is passed through a pipe 8 to a condenser 37 which condenses substantially all of the styrene. This condensed material and any uncondensed material from condenser 37 are passed into a separator 39. The condensate or liquid styrene is removed from separator 39 through a pipe 41 for subsequent use as desired. Vapors from separator 39 are removed by way of a pipe 43 and are combined with vaporous material from surge tank 4 passing through a pipe 9 and this combined material is passed on through pipes 29 and 30 under the influence of a vacuum pump 42. From pipe 30 this material is combined with material flowing through a pipe 36.

Condensed butadiene produced in condenser 14 and separated in separator 15 is removed from this separator by way of a pipe 31 and is passed into a storage tank 32. Vaporous material from storage tank 32 is removed through pipe 36 and is combined with the aforementioned vaporous material from pipe 30 and this combined stream of vapors is further combined with vapors flowing through pipe 10. All of these vapors, as combined, flow on through pipe 11 and pipe 12 to follow a course of flow as set forth above.

Reference numeral 33 identifies the vaporous butadiene in storage tank 32 while reference numeral 34 identifies the butadiene liquid phase in this tank. This liquid is withdrawn by way of a pipe 35 for such disposal as desired. Vaporous material from flash tank 21 is passed by way of a pipe 27 and is combined with vapors entering pipe 12 from pipe 11. Vaporous material from tank 24 is passed through a pipe 28 and is combined with vapors from pipe 29 prior to passage into the vacuum pump 42.

A pipe 18 conducts unabsorbed gaseous materials from the top of the absorber 17 to such disposal as desired.

In order to absorb the butadiene from the vapors fed to the absorber, I operate this mineral seal oil absorber at a pressure from about 25–60 p.s.i.g. Rich absorbent oil at this pressure is passed through line 19 and on passing through the pressure reduction valve 20 pressure on this oil stream is reduced to about 3 p.s.i.g. By this reduction of pressure a considerable proportion of the absorbed butadiene is evolved from the mineral seal oil and as mentioned above this evolved material is passed through line 27 for condensing in condenser 14. The butadiene which is condensed in condenser 14 is separated as a liquid phase in separator 15 and this separated liquid butadiene is passed through pipe 31 to a storage tank 32 and this liquid material is the finished and purified butadiene product of the process.

Absorption oil removed by way of pipe 22 from flash tank 21 still contains an appreciable proportion of butadiene and the pressure on this partially depleted absorbent is reduced still further in passing through valve 23 to about 50 millimeters of mercury absolute. This relatively low pressure in flash tank 24 is maintained by the action of the vacuum pump 42. At this relatively low pressure substantially all of the butadiene is flashed from the absorption oil and the depleted absorbent passes through pipe 25 and is pumped by pump 26 through pipe 44 for reintroduction into the absorber 17. In this manner I am able to absorb the butadiene from the oxygen and nitrogen contained in the feed to the absorber without the consumption of chemicals. Absorbent liquid required in the operation as starting absorbent and as makeup absorbent is introduced into the system from a source, not shown, through a pipe 38.

The pressure of about 3 p.s.i.g. maintained in flash tank 21 is produced by the action of pump 13 communicating with pipe 12.

I have found by separating vapor from liquid in separator tank 2 which also is maintained under about 3 p.s.i.g. by pump 13 that substantially all of the butadiene is separated from the latex. To make certain all of the butadiene is removed from the latex it is exposed to the absolute pressure of about 50 millimeters of mercury in the surge tank 4 and this low pressure is maintained therein by the action of the vacuum pump 42. By the time the latex leaves the surge tank 4 it is for all practical purposes free from butadiene but it still contains an amount of styrene. In stripper vessel 6 a very small amount of live steam is used as a stripping agent for removal of the styrene. In stripper 6 the recoverable styrene is removed and passed through pipe 8 and condensed in condenser 37. Condensate is separated in separator 39 and this condensate is substantially pure styrene and is removed through pipe 41 for recycling to the butadiene-styrene copolymerization operation. Vapors removed from separator tank 39 by vacuum pump 42 contain at least a small amount of styrene and this styrene when added to the butadiene passing from pipe 10 to pipe 11 adds from about 1 to 1½ percent styrene to the butadiene. In this manner the final butadiene product removed from storage tank 32 contains about 1 to 1½ percent styrene by weight.

The following tabulation sets forth the operating conditions of temperature and pressure maintained in various parts of the system:

Table I

| Vessel | Temperature | Pressure |
| --- | --- | --- |
| Flash tank 21 | | 3 lbs. p.s.i.g. |
| Flash tank 24 | | 50 mm. abs. |
| Absorber 17 | 50° to 100° F., preferably 70°–80° F. | 25–60 p.s.i.g. |
| Run Storage 32 | 50°–80° F., preferably 55°–75° F. | 15–30 p.s.i.g. pref. 20–25 p.s.i.g. |
| Stripper 6 | | 50 mm. abs. |
| Separator tank 4 | | 50 mm. abs. |
| Separator tank 39 | | 50 mm. abs. |
| Separator tank 2 | | 3 p.s.i.g. |

I have found that in operating such an oxygen (and nitrogen) separating system that liquid butadiene removed from tank 32 contains approximately 10 parts of dissolved oxygen per million while the incoming butadiene from the vacuum recovery system in pipe 10 contained about 100 parts per million. When recovered butadiene contains about 10 parts per million of oxygen, and about 1 part of recovered butadiene is blended with 2 parts freshly prepared butadiene which contains substantially no oxygen, the final blend contains less than 4 parts per million of dissolved oxygen. Butadiene containing less than 4 parts per million of oxygen has little to no effect upon the rate of copolymerization of butadiene and styrene even when polymerized at 40° F. and lower to form the so-called cold rubber.

By the term mineral seal oil I mean the conventional type of relatively high boiling straight run petroleum oil which frequently has a molecular weight in the range of about 200. However other oils can be used as the absorption oil of my process but the oil should be capable of selectively absorbing butadiene from atmospheric oxygen and nitrogen and the oil must also possess a sufficiently low vapor pressure at absorber temperatures that absorption oil vapors will not be lost in the waste gases. Similarly, the absorption oil should possess a sufficiently low partial pressure at flash pressures that the oil will not be carried overhead with the butadiene.

I have described herein the operation of my purification process as applied to the purification of butadiene. I have selected butadiene merely as an example of the principles involved, but the process is equally applicable for the purification of other diolefinic compounds such as pentadiene, isoprene, chloroprene, piperylene, methylpentadiene, 2,3-dimethyl-1,3-butadiene, and such other hydrocarbons from which it is desired to remove free oxygen.

Such auxiliary apparatus as pressure, and temperature indicating, recording and controlling equipment, many valves and the like, are not illustrated in the drawing nor disclosed for simplicity and brevity purposes. The need for such apparatus, its installation and operation are well understood by those skilled in the art.

While mineral seal oil has been herein disclosed as the absorbent, its use was described merely as an example of a suitable absorbent. Other absorbents, such as furfural, hydrocarbons lower boiling than mineral seal oil can also be used. It is merely necessary that the absorbent be non-corrosive to equipment, non-reactive chemically with materials in process, possess sufficient selective solvent power for the hydrocarbon over the components of air and possess such vapor pressure and/or partial pressure characteristics as not to be lost in the effluent gases from the absorber and not to be carried overhead from the flashing tanks with the hydrocarbon being purified.

While the above flow diagram has been described for illustrative purposes the invention obviously is not limited thereto.

I claim:

1. A method for removing free oxygen from an admixture with butadiene comprising contacting vaporous butadiene feed stock containing free oxygen impurity with an absorbent mineral seal oil in a vapor-liquid absorption zone maintained at a super-atmospheric pressure, withdrawing absorbent mineral seal oil containing dissolved butadiene, reducing the pressure of the withdrawn mineral seal oil containing dissolved butadiene in a first flashing operation, withdrawing flashed butadiene from said first flashing operation, further reducing the pressure on the absorbent mineral seal oil from the first flashing operation to a sub-atmospheric pressure in a second flashing operation, removing absorbent mineral seal oil from this second flashing operation and returning same to the absorption operation, removing flashed butadiene from the second flashing operation and combining same with the butadiene from the first flashing operation and with the feed stock vaporous butadiene, at least partially condensing this combined butadiene and removing butadiene condensate as the product of the process and passing the uncondensed butadiene to the above mentioned absorption operation.

2. The method of claim 1 wherein the absorption operation is carried out at a super-atmospheric pressure between approximately 25 and 60 p.s.i.g., and the first and second flashing operations are carried out at about 3 p.s.i.g. and 50 millimeters mercury absolute pressure, respectively.

3. The method of claim 1 wherein the absorption operation is carried out at a temperature between the approximate limits of 50° F. and 100° F.

4. In the method of claim 1, further separating vaporous butadiene from the last mentioned butadiene condensate, combining these last separated vapors with the vaporous butadiene feed stock, and recovering liquid butadiene of a reduced oxygen content from the latter separating operation as the product of the process.

5. The method of claim 1 wherein the vaporous butadiene feed stock contains up to about 1½ percent styrene by weight.

6. A method for removing free oxygen from an admixture with butadiene comprising contacting vaporous butadiene feed stock containing free oxygen impurity with an absorbent mineral seal oil in a vapor-liquid absorption zone maintained at a super-atmospheric pressure, withdrawing absorbent mineral seal oil containing dissolved butadiene, reducing the pressure of the withdrawn mineral seal oil containing dissolved butadiene in a first flashing operation, withdrawing flashed butadiene from said first flashing operation, further reducing the pressure on the absorbent mineral seal oil from the first flashing operation to a sub-atmospheric pressure in a second flashing operation, removing flashed mineral seal oil from the second flashing operation and returning same to the absorption operation, removing flashed butadiene from the second flashing operation and combining same with the butadiene from the first flashing operation and with the feed stock vaporous butadiene, at least partially condensing this combined butadiene and removing butadiene condensate to a storage zone as the product of the process, withdrawing butadiene vapor containing free oxygen impurity from said storage zone, and passing the withdrawn butadiene vapor and the uncondensed butadiene to the abovementioned absorption operation.

7. In the method of claim 1, further separating vaporous butadiene from the last mentioned butadiene condensate at a pressure of from about 15 to 30 p.s.i.g. combining this last separated vaporous butadiene with the vaporous butadiene feed stock, and recovering liquid butadiene of a reduced oxygen content from the latter separating operation as the product of the process.

8. A method for removing free oxygen from a vaporous feed stock admixture of free oxygen with a diolefinic compound selected from the group consisting of butadiene, pentadiene, isoprene, chloroprene, piperylene, methylpentadiene and 2,3-dimethyl-1,3-butadiene comprising contacting said admixture with an absorbent mineral seal oil in a vapor-liquid absorption zone maintained at a super-atmospheric pressure, withdrawing absorbent mineral seal oil containing said diolefinic compound, reducing the pressure of the withdrawn mineral seal oil containing dissolved diolefinic compound in a first flashing operation, withdrawing flashed diolefinic compound from said first flashing operation, further reducing the pressure on the absorbent mineral seal oil from the first flashing operation to a subatmospheric pressure in a second flashing operation, removing absorbent mineral seal oil from this second flashing operation and returning same to the absorption operation, removing flashed diolefinic compound from the second flashing operation and combining same with the diolefinic compound from the first flashing operation and with the feed stock diolefinic compound, at least partially condensing those combined diolefinic materials and removing diolefinic compound condensate as the product of the process and passing vapors remaining from the partial condensing operation to the above mentioned absorption step.

9. In the method of claim 8, further continuously separating vapors of said diolefinic compound from the last mentioned condensate, combining these last separated vapors with the first mentioned vaporous admixture, and recovering liquid diolefinic compound of reduced oxygen content from the further continuous separation operation as the product of the process.

10. A method for removing free oxygen from an admixture with butadiene comprising contacting a first vaporous butadiene feed stock containing free oxygen impurity with an absorbent mineral seal oil in a vapor-liquid absorption zone maintained at a super-atmospheric pressure, withdrawing absorbent mineral seal oil containing absorbed butadiene from said absorption zone, reducing the pressure of the withdrawn mineral seal oil containing absorbed butadiene in a first flashing operation, withdrawing flashed butadiene from said first flashing operation, further reducing the pressure on the absorbent mineral seal oil from the first flashing operation to a sub-atmospheric pressure in a second flashing operation, removing flashed mineral seal oil from the second flashing operation and returning same to the absorption operation as the first mentioned absorbent mineral seal oil, removing flashed butadiene from the second flashing operation and combining same with a second vaporous butadiene feed stock containing free oxygen impurity and with the butadiene from the first flashing operation, at least partially condensing this combined butadiene and removing butadiene condensate to a storage zone as the product of the process, continuously withdrawing butadiene vapor containing free oxygen impurity from said storage zone, passing this withdrawn butadiene vapor with the butadiene combined from the first and second flashing steps and second feed stock to the partial condensing step, and the uncondensed butadiene from the partial condensing step being said first vaporous butadiene feed stock.

References Cited in the file of this patent

UNITED STATES PATENTS

| | | |
|---|---|---|
| 1,958,553 | Van Nuys | May 15, 1934 |
| 2,376,425 | Frey | May 22, 1945 |
| 2,386,310 | Hachmuth | Oct. 9, 1945 |
| 2,600,133 | Simms | June 10, 1952 |
| 2,631,175 | Crouch | Mar. 10, 1953 |
| 2,689,624 | Davis | Sept. 21, 1954 |
| 2,765,872 | Hartman et al. | Oct. 9, 1956 |